Aug. 24, 1948.  C. EVENSEN  2,447,692
COFFEE MAKING APPARATUS
Filed March 25, 1946
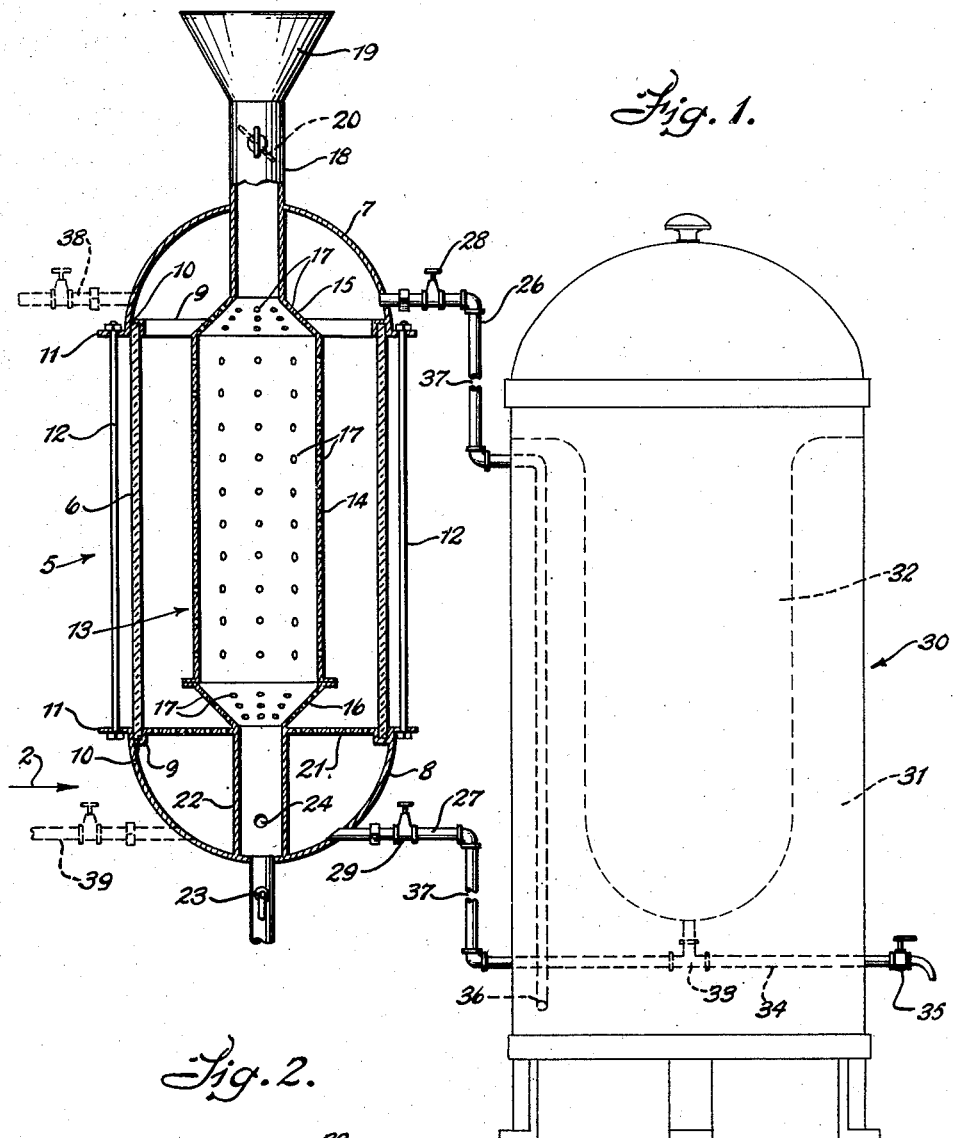
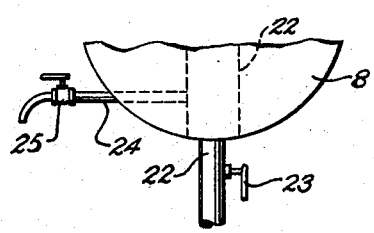
Inventor
*Christian Evensen.*
By *Clarence A. O'Brien
and Harvey B. Jacobson*
Attorneys Patented Aug. 24, 1948

2,447,692

UNITED STATES PATENT OFFICE 2,447,692

COFFEE-MAKING APPARATUS

Christian Evensen, Melrose Park, Ill.

Application March 25, 1946, Serial No. 656,861

3 Claims. (Cl. 99—289)

This invention relates to new and useful improvements and structural refinements in a coffee making apparatus, and the principal object of the invention is to provide a device of the character herein described, such as may be effectively and conveniently employed for the making of fresh, pure coffee, possessing flavor superior to that heretofore obtained by using devices of conventional design.

While the apparatus may be efficiently employed for the making of coffee in any desired quantity, a further object of this invention is to provide a device which is particularly adapted for use in restaurants and the like, for the making of coffee in relatively large volumes.

Conventional devices heretofore employed for this purpose usually assume the form of what is commonly referred to as "coffee urns." The same generally consists of a boiler containing a coffee receptacle or container and coffee grains are usually placed in a cloth bag, which in turn, is suspended into said container. The water from the boiler "percolates," so to speak, through the coffee grains in the bag and finished coffee subsequently gathers in the container, in readiness for use.

Inasmuch as coffee making in this manner is more or less a continuous operation and finished coffee frequently remains in the container for considerable periods of time, the coffee grains in the bag are usually exposed to steam, excessive heat, and the like, whereby their flavor is detrimentally affected. Furthermore, the boiling operation results in the formation of a deposit or coating on the metallic walls of the urn and since the same cannot be readily cleaned, the coffee usually remains in contact with such impurities and the flavor thereof is further impaired.

It is therefore another object of the invention to provide, as aforesaid, a coffee making apparatus whereby the above stated disadvantages may be completely eliminated.

An additional object of the invention is to provide a coffee making apparatus in which coffee may be made in any required quantity and of any desired strength.

A still further object of the invention is to provide an apparatus which is simple in construction and which may be readily disassembled for purposes of cleaning, inspection or repair.

With the above more important objects in view, and such other objects as may become apparent as this specification proceeds, the invention consists essentially of the arrangement and construction of parts as illustrated in the accompanying drawings, in which:

Figure 1 is a cross-sectional view of the invention, illustrating the same connected to a conventional coffee urn, and Figure 2 is a fragmentary side elevational view, taken in the direction of the arrow 2 in Figure 1.

Like characters of reference are used to designate like parts in the specification and throughout the several views.

Referring now to the accompanying drawings in detail, the invention consists of a vertically disposed housing designated generally by the reference character 5, the same comprising a transparent, cylindrical casing 6 open at the ends thereof and substantially semi-spherical caps 7 and 8, removably positioned at the open ends of the casing 6. The latter may assume the form of a glass tube and the caps may be provided with suitable marginal straps 9, these in turn, forming annular grooves 10, adapted to receive the end portions of the casing 6. The caps 7 and 8 are also provided with outturned flanges 11 and suitable tie rods 12 may be employed for removably securing the housing 5 as a whole together.

A jacket designated generally by the reference character 13 is positioned concentrically in the housing 5 and consists of a cylindrical body 14 open at the ends thereof and carrying the substantially frusto-conical neck portions 15 and 16. The body 14 as well as the portions 15, 16 are formed with suitable perforations 17 and a filler tube 18 is secured to the portions 15, as will be clearly apparent from the accompanying drawings.

This tube is in communication with the interior of the jacket 13 and projects through the upper end of the housing 5 (through the cap 7) to carry a funnel-shaped hopper 19. A butterfly valve 20 is positioned in the projecting portion of the tube 18, adjacently to the hopper.

The lower of the straps 9 may be formed integrally with a screen 21, this extending between the lower end of the casing 6 and the adjacent cap 8. A drain tube 22 is secured to the neck portion 16, in communication with the interior of the jacket 14. The tube 22 passes through the screen 21 and projects through the cap 8.

The protruding portion of the tube 22 is also provided with a control valve 23 and a coffee outlet pipe 24 is connected to the drain tube and protrudes from the cap 8 to carry a valve or tap 25.

A water inlet pipe 26 enters the cap 7 and a further coffee outlet pipe 27 is provided in the cap 8. It will be noted that both the pipe 26 and the pipe 27 are in communication with the interior of the housing 5 and suitable control valves 28 and 29 are provided on the two aforementioned pipes, respectively.

The conventional coffee urn designated generally by the reference character 30 contains the usual water boiler 31, in which is positioned a coffee receptacle or container 32. The lower end of the latter carries a T 33, one arm of which is extended as at 34 and terminates in a drain tap 35. The remaining arm of the T 33 is connected to the aforementioned pipe 27, while the pipe 26 communicates with the boiler 31 as at 36.

When the invention is placed in use, fresh coffee grains are placed in the hopper 19 and upon opening the valve 20, the same are allowed to gravitate into the jacket 13. The valve 23 is, of course, closed and by opening the valve 28, hot water may be drawn into the housing 5 from the boiler 31 through the tube 26.

The water enters the jacket 13 through the apertures 17 and after penetrating the coffee grains in the jacket, finished coffee will pass through the screen 21 into the lower cap 8. By opening the valve 29, this coffee will now flow through the pipe 27 into the container 32, from which it may be conveniently withdrawn in readiness for use by opening the tap 35.

It should be understood that the passage of water from the boiler 31 into the housing 5 is assisted by steam pressure existing in the boiler. The return of coffee through the pipe 27 is facilitated by positioning the coffee making apparatus as a whole, substantially above the level of the container 32, in order that the coffee may flow into the container under gravity. For convenience of illustration, the elevated relationship of the apparatus with respect to the container has not been shown in the accompanying drawings, with exception of the broken portions 37 in the pipes 27 and 26.

The coffee making operation may be conveniently observed through the transparent casing 6, whereby the operation may be continued until coffee of the desired strength and color has been prepared.

It should be noted that finished coffee will also gather in the drain tube 22. By virtue of the presence of coffee grains in this tube, this coffee will be of relatively greater strength as compared to that flowing through the pipe 27. Accordingly, the pipe 24 and the associated tap 25 were provided for the convenience of persons desiring exceptionally strong coffee.

After the coffee making operation has been completed, the used coffee grains may be readily removed from the jacket 13 by opening the valve 23 and the valve 28, and closing the valve 29. It will be apparent that the water from the pipe 26 will again enter the jacket 13 and "wash out" so to speak, the coffee grains through the drain tube 22.

If desired, the invention may be used simultaneously in association with more than one of the urns 30, this being accomplished by connecting the additional urns (not shown) to the apparatus by means of further water inlet pipes and coffee outlet pipes 38 and 39 respectively.

Alternatively, the urns 30 may be completely eliminated and the apparatus used per se by connecting the pipe 26 to a suitable source of hot water and discharging the pipe 27 into a suitable receptacle.

It is believed that the operation and advantages of the invention will be readily understood from the foregoing disclosure and accordingly, further description thereof at this point is regarded as unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A coffee making apparatus comprising in combination, a vertically disposed housing comprising a transparent, cylindrical casing open at the ends thereof, and a substantially semi-spherical cap removably positioned at each end of said casing, a jacket positioned concentrically in said housing and adapted to contain coffee grains, said jacket comprising a cylindrical body open at the ends thereof, and a frusto-conical neck portion at each end of said body, said body and said neck portion being perforated, a filler tube connected to the upper of said neck portions and communicating with the interior of said jacket, said tube projecting through the upper end of said housing, a funnel-shaped hopper at the projecting end of said tube, a butterfly valve in said tube adjacent to said hopper, a screen between the lower end of said casing and the adjacent of said caps, a drain tube connected to the lower of said neck portions and communicating with the interior of said jacket, said drain tube passing through said screen and projecting through the lower end of said housing, a further valve in the projecting end of said drain tube, a water inlet pipe and a coffee outlet pipe in the upper and lower of said caps respectively, said pipes communicating with the interior of said housing, and a control valve on each of said pipes.

2. The device as defined in claim 1 together with a further coffee outlet pipe connected to said drain tube and projecting from the adjacent of said caps, and a tap at the projecting end of said last-mentioned pipe.

3. In association with a coffee urn including a boiler and a coffee container therein, the device as defined in claim 1 in which said water inlet is connected to said boiler and said coffee outlet is in communication with said container.

CHRISTIAN EVENSEN.

REFERENCES CITED

The following references are of record in the file of this patent:

UNITED STATES PATENTS

| Number | Name | Date |
|---|---|---|
| 362,086 | Irlbacher | May 3, 1887 |
| 389,079 | Huff | Sept. 4, 1888 |
| 1,491,196 | Cannone et al. | Apr. 22, 1924 |
| 2,012,645 | Thomas | Aug. 27, 1935 |
| 2,016,281 | Harper et al. | Oct. 8, 1935 |
| 2,077,564 | Heuser | Apr. 20, 1937 |
| 2,252,614 | Bowen | Aug. 12, 1941 |